United States Patent
Bevan et al.

(10) Patent No.: US 12,381,777 B2
(45) Date of Patent: Aug. 5, 2025

(54) DISTRIBUTED NODE DISCOVERY AND OVERLAY PATH MANAGEMENT ON A DATA COMMUNICATION NETWORK

(71) Applicant: Fortinet, Inc., Sunnyvale, CA (US)

(72) Inventors: Stephen John Bevan, Auckland (NZ); Dmitry Perets, Bologna (IT)

(73) Assignee: Fortinet, Inc., Sunnyvale, CA (US)

(*) Notice: Subject to any disclaimer, the term of this patent is extended or adjusted under 35 U.S.C. 154(b) by 0 days.

(21) Appl. No.: 17/566,801

(22) Filed: Dec. 31, 2021

(65) Prior Publication Data
US 2023/0216733 A1 Jul. 6, 2023

(51) Int. Cl.
*H04L 41/0806* (2022.01)
*H04L 41/12* (2022.01)
*H04L 45/64* (2022.01)

(52) U.S. Cl.
CPC .......... *H04L 41/0806* (2013.01); *H04L 41/12* (2013.01); *H04L 45/64* (2013.01)

(58) Field of Classification Search
CPC ......... H04L 12/46; H04L 12/28; H04L 45/00; H04L 45/24; H04L 45/02; H04L 12/66; H04L 45/302; H04L 49/25; H04L 41/122; H04L 41/40; H04L 41/0806; H04L 41/12; H04L 45/64; H04L 45/22; H04L 43/08
See application file for complete search history.

(56) References Cited

U.S. PATENT DOCUMENTS

| | | | | |
|---|---|---|---|---|
| 7,447,901 | B1 * | 11/2008 | Sullenberger | H04L 63/0272 |
| | | | | 713/153 |
| 7,848,335 | B1 * | 12/2010 | Kang | H04L 63/0272 |
| | | | | 370/409 |
| 10,148,495 | B1 * | 12/2018 | Oczkowski | H04W 8/20 |
| 10,938,717 | B1 * | 3/2021 | Sundararajan | H04L 45/50 |
| 11,329,883 | B2 | 5/2022 | Zhang | |
| 11,451,484 | B2 * | 9/2022 | Bajaj | H04L 43/16 |
| RE49,485 | E * | 4/2023 | Khan | H04L 45/00 |
| | | | | 726/15 |
| 11,824,754 | B2 | 11/2023 | Magnezi et al. | |
| 2003/0177221 | A1 | 9/2003 | Ould-Brahim et al. | |
| 2010/0228709 | A1 * | 9/2010 | Ahmed | G06F 3/0659 |
| | | | | 711/E12.001 |
| 2011/0004913 | A1 | 1/2011 | Nagarajan et al. | |
| 2011/0219447 | A1 * | 9/2011 | Horovitz | G06F 9/45533 |
| | | | | 726/22 |

(Continued)

OTHER PUBLICATIONS

Aruba, SD-WAN Solution, Jul. 2019, Revision 02, pp. 1-316 (Year: 2019).*

(Continued)

*Primary Examiner* — Tonia L Dollinger
*Assistant Examiner* — Linh T. Nguyen
(74) *Attorney, Agent, or Firm* — Law Office of Dorian Cartwright; Dorian Cartwright

(57) ABSTRACT

An initial provisioning by a management plane of the SD-WAN is received from a centralized SD-WAN gateway with static path overlay between the network edge device on a local LAN and the centralized SD-WAN gateway. At runtime, intelligent decision are made about which overlay path to select and when for the new flow over a control plane of the SD-WAN, based on the topology of the remote network edge and the local SDWAN policy, and to build the selected overlay path.

5 Claims, 4 Drawing Sheets

(56) References Cited

U.S. PATENT DOCUMENTS

| | | | |
|---|---|---|---|
| 2014/0380460 A1 | 12/2014 | Bhalerao et al. | |
| 2015/0382198 A1* | 12/2015 | Kashef | H04L 67/303 |
| | | | 726/5 |
| 2016/0261506 A1 | 9/2016 | Hegde et al. | |
| 2017/0230199 A1* | 8/2017 | Shen | H04L 12/4633 |
| 2019/0052658 A1* | 2/2019 | Clarke | H04L 63/1425 |
| 2019/0140955 A1* | 5/2019 | Hemige | H04L 43/0811 |
| 2020/0042416 A1* | 2/2020 | Satoyama | G06F 11/1092 |
| 2020/0336464 A1 | 10/2020 | Hastings | |
| 2021/0036887 A1* | 2/2021 | Meng | H04L 45/22 |
| 2021/0067442 A1* | 3/2021 | Sundararajan | H04L 41/0893 |
| 2021/0160170 A1* | 5/2021 | Ramaswamy | H04L 43/08 |
| 2021/0160251 A1* | 5/2021 | Keisam | H04L 63/061 |
| 2021/0168125 A1* | 6/2021 | Vemulpali | H04L 63/0263 |
| 2021/0173578 A1* | 6/2021 | Jesionowski | G06F 3/065 |
| 2021/0306247 A1 | 9/2021 | Duan | |
| 2021/0352151 A1* | 11/2021 | Gupta | H04L 43/16 |
| 2022/0103427 A1* | 3/2022 | Mallipudi | H04L 41/082 |
| 2022/0191251 A1* | 6/2022 | Gavish | H04L 63/20 |
| 2022/0210139 A1* | 6/2022 | Hetzler | H04L 9/14 |
| 2022/0232411 A1* | 7/2022 | Vijayakumar | H04W 28/0268 |
| 2022/0286406 A1* | 9/2022 | Sethi | G06F 9/45558 |
| 2022/0394014 A1* | 12/2022 | Wang | H04L 63/04 |
| 2023/0029882 A1* | 2/2023 | Hooda | H04L 43/08 |
| 2023/0059537 A1 | 2/2023 | Gavand et al. | |
| 2023/0216733 A1 | 7/2023 | Bevan et al. | |
| 2024/0015529 A1* | 1/2024 | Xu | H04W 24/02 |
| 2024/0291760 A1 | 8/2024 | Duan et al. | |

OTHER PUBLICATIONS

C. Kaufman et al., Internet Key Exchange Protocol Version 2 (IKEv2), Standards Track, Oct. 14, 2014, RFC 7296, 142 pages.

F. Audet, Ed. et al., Network Address Translation (NAT) Behavioral Requirements forUnicast UDP, Best Current Practice, Audet & Jennings, Jan. 2007, 29 pages.

* cited by examiner

DISTRIBUTED NODE DISCOVERY AND OVERLAY PATH MANAGEMENT ON A DATA COMMUNICATION NETWORK

FIELD OF THE INVENTION

The invention relates generally to computer networking, and more specifically, to dynamic overlay path management at runtime on a control plane of the SD-WAN (software-defined-wide area network).

BACKGROUND

In a SD-WAN, each customer site is connected to one or more underlay transports. There is thus more than one feasible overlay path between pairs of sites. Because provisioning of overlay paths occurs before real-time packets are sent over underlay transports, decisions on overlay paths are static regardless of current conditions on the overlay paths.

SD-WANs are generally operated from a management plane at a centralized SD-WAN server. When spokes are initially provisioned, certain information is collected about each spoke which is subsequently shared with other spokes as a view into remote networks. Problematically, the view changes over time and the initial provisioning is not appropriate for later decisions.

Therefore, what is needed is a robust technique for a system for dynamic overlay path management at runtime on a control plane of the SD-WAN. The solution should be capable of adaptations without operator intervention to build overpay paths, measured and torn down dynamically, based on combination of the traffic patterns, real-time network conditions and administratively configured policies.

SUMMARY

These shortcomings are addressed by the present disclosure of methods, computer program products, and systems for dynamic overlay path management at runtime on a control plane of the SD-WAN In one embodiment, initial provisioning by a management plane of the SD-WAN is received from a centralized SD-WAN gateway with static path overlay between the network edge device on a local LAN and the centralized SD-WAN gateway. The initial provisioning includes a local SD-WAN policy.

In another embodiment, responsive to new data flow from a client on the local LAN in real-time, a remote network edge device associated with a destination of the new flow and a topology of the remote network edge device having two or more links connecting the remote network edge device to the data communication network, are discovered.

In yet another embodiment, intelligent decisions are made about which overlay path to select and when for the new flow over a control plane of the SD-WAN, based on the topology of the remote network edge and the local SDWAN policy, and to build the selected overlay path.

Advantageously, computer hardware performance, and also computer networking performance, is improved with reduced bottlenecks in the SD-WAN gateway and the edge device.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for dynamic overlay path management at runtime on a control plane of the SD-WAN.

One of ordinary skill in the art will recognize many additional variations made possible by the succinct description of techniques below.

I. Systems for Dynamic Overlay Path Management at Runtime (FIGS. 1-3)

Figure 1:
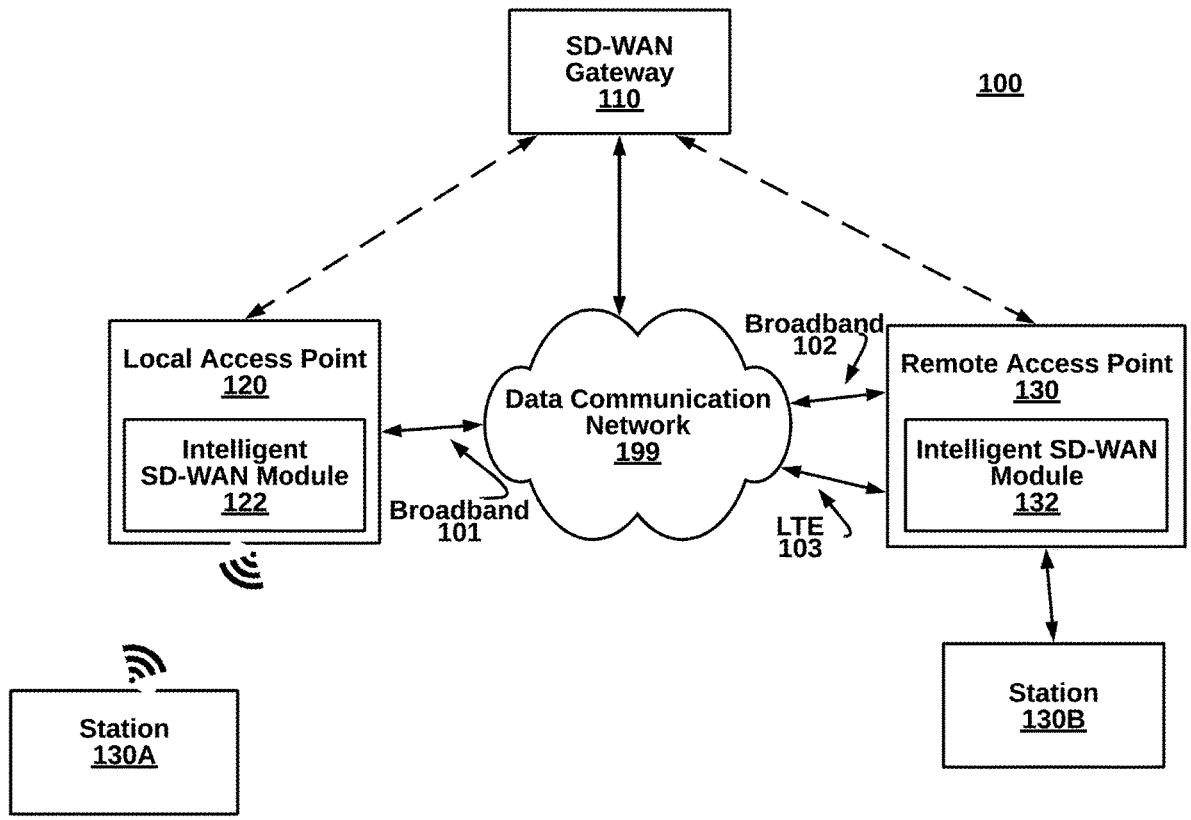
FIG. 1 is a high-level block diagram illustrating a system for dynamic overlay path management at runtime on a control plane of the SD-WAN, according to an embodiment.
Figures 2, 3:
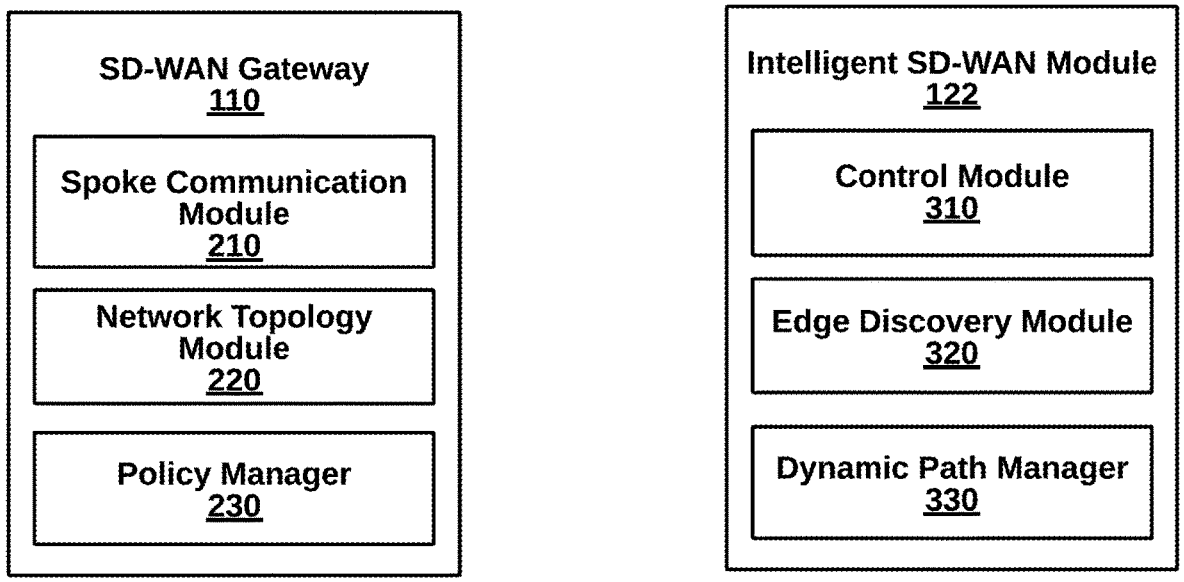
FIG. 2 is a more detailed block diagram illustrating of a local access point of the system of FIG. 1, according to an embodiment.
FIG. 3 is a more detailed block diagram illustrating of a local access point of the system of FIG. 1, according to an embodiment.

FIG. 1 is a high-level illustration of a system 100 for dynamic overlay path management at runtime on a control plane of the SD-WAN, according to an embodiment. The system 100 comprises an SD-WAN gateway 110, a local access point 120, and a remote access point 130. Many other configurations are possible, for example, with additional network components such routers, switches, repeaters, firewalls, and the like. Also, there can be many more or fewer clients in FIG. 1. The system components can be implemented in computer devices with non-transitory source code, such as set forth below with reference to FIG. 5.

The components of the system 100 are coupled in communication over the data communication network. Preferably, the SD-WAN gateway 110 and the access points 120, 130 are connected to the data communication system via hard wire. More specifically, the local access point 120 has a broadband wired connection 101 and the remote access point 130 has a broadband wired connection 102 and an LTE wired connection 103. The stations 130A,B are preferably connected to access points via a wireless channel. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11.

In one embodiment, the SD-WAN gateway 110 statically provisions overlay paths at set-up. Overlay paths can be VPN (virtual private network) links using IPSec as security. In another embodiment, just a framework of data is provided for dynamic overlay paths at runtime. Runtime data including current conditions and current remote pathways either alone, or with the framework, determines pathways at the time triggered, rather than at initial set-up. In other operations, a spoke communication module 210 tracks and monitors each of the connected spokes. A network topology module 220 maintains an overview of the network or different networks based on information collected from spokes. A policy manager 230 applies polies from a network-wide perspective.

The local access point 120 and the remote access point 130, dynamically provision overlay paths at runtime. Runtime can be policy based or when a data packet is received from transmission to another spoke in a SD-WAN. A control plane of the SD-WAN permits adjustments without operator intervention. As a result, overlay paths can be built, measured and torn down dynamically, based on a combination of traffic patterns, real-time network conditions and administratively configured policies. To do so, an edge discovery process between the edge device 120 and a remote edge device is triggered to exchange necessary properties about each other, such as which underlay transport(s) are currently connected, special attributes about each connection, real-time remote conditions, and the like. For example, WAN link descriptors can be exchanged, along with its IP address for IKE negotiations and a domain ID to specify the type of underly transport. In another example, site name and site ID are exchanged.

Next, a path management process uses discovered information to make a local decision as to what overlay path(s) to build and when. Additionally, a local overlay path is set up within a local LAN of the local access point 120. An embodiment maintains a table of active speakers. Entries can be removed due to inactivity.

The path selection can involve whether there is any current traffic flow between A and B; what underlay transports A and B are currently connected to (e.g., Internet, MPLS, LTE, broadband, etc.); real-time health measurements of different feasible paths between A and B; and administratively configured policies such as underlay transport properties, path preferences, per-application SLA targets, and the like. The path health be defined by one or more of latency, packet loss and jitter measurements. Latency is the time that it takes for a data packet to travel from source to destination. Packet loss occurs when packets fail to reach a destination. Jitter refers to a disruption in data flows due to network traffic jams, improper packet queueing and set up errors.

FIG. 2 is a more detailed illustration of the intelligent SD-WAN module 122 (or the SD-WAN module 132) of the system 100 of FIG. 1. The intelligent SD-WAN module 122 includes a control module 310, an edge discovery module 320, and a dynamic path manager 330. The modules can be implemented in source code stored in non-transitory memory executed by a processor. Alternatively, the modules can be implemented in hardware with microcode. The modules can be singular or representative of functionality spread over multiple components. Many other variations are possible.

The control module 310 can receive initial provisioning by a management plane of the SD-WAN from a centralized SD-WAN manager with static path overlay between the network edge device on a local LAN and the centralized SD-WAN gateway. The initial provisioning includes a local SD-WAN policy. In some embodiments, updated provisioning is received.

The edge discovery module 320, responsive to new data flow from a client on the local LAN in real-time, discovers a remote network edge device associated with a destination of the new flow and a topology of the remote network edge device having two or more links connecting the remote network edge device to the data communication network.

The dynamic path manager 330 to make intelligent decision about which overlay path to select and when for the new flow over a control plane of the SD-WAN, based on the topology of the remote network edge and the local SDWAN policy, and to build the selected overlay path.

II. Method for Dynamic Overlay Path Management at Runtime (FIG. 4)

Figure 4:
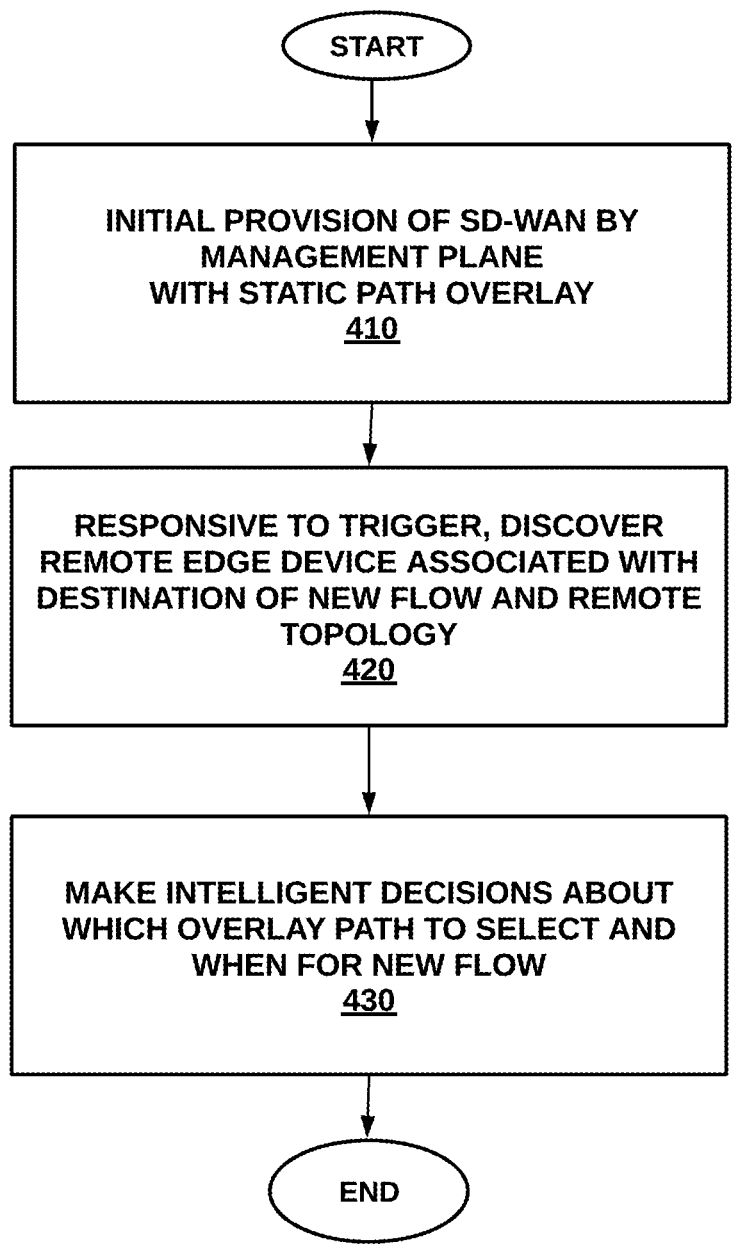
FIG. 4 is a high-level flow diagram illustrating a method for dynamic overlay path management at runtime on a control plane of the SD-WAN, according to one preferred embodiment.

FIG. 4 is a high-level flow diagram illustrating a method for dynamic overlay path management at runtime on a control plane of the SD-WAN, according to one embodiment. The method 400 can be implemented, for example, by the system 100 of FIG. 1. The steps are merely representative groupings of functionality, as there can be more or fewer steps, and the steps can be performed in different orders. Many other variations of the method 400 are possible.

At step 410, initial provisioning by a management plane of the SD-WAN is received from a centralized SD-WAN manager with static path overlay between the network edge device on a local LAN and the centralized SD-WAN gateway. The initial provisioning includes a local SD-WAN policy.

At step 420 responsive to new data flow from a client on the local LAN in real-time, a remote network edge device associated with a destination of the new flow and a topology of the remote network edge device having two or more links connecting the remote network edge device to the data communication network, are discovered (e.g., Internet, MPLS, LTE, broadband, etc.).

At step 430, intelligent decisions are made about which overlay path to select and when for the new flow over a control plane of the SD-WAN, based on the topology of the remote network edge and the local SDWAN policy, and to build the selected overlay path.

Figure 5:
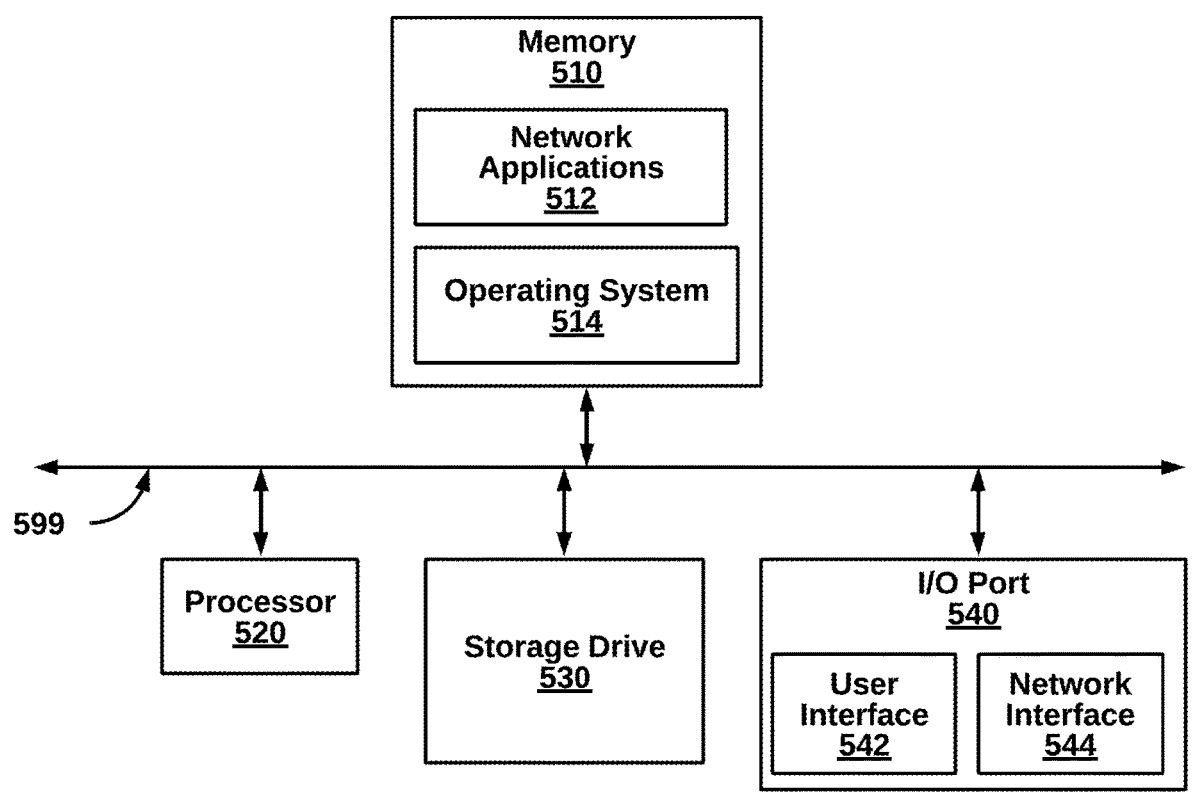
FIG. 5 is a block diagram illustrating a computer device for implementing components of the system of FIG. 1, according to one embodiment.

III. Generic Computing Environment (FIG. 5)

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A network edge device in an SD-WAN (software-defined-wide area network) of a data communication network for dynamic overlay path management at runtime on a control plane of the SD-WAN, the network edge device comprising:
   a processor;
   a network communication interface, communicatively coupled to the data communication network; and
   a memory, communicatively coupled to the processor and storing:
   a control module to receive initial provisioning by a management plane of the SD-WAN from a centralized SD-WAN manager with static path overlay between the network edge device on a local LAN and the centralized SD-WAN gateway, wherein the initial provisioning includes a local SD-WAN policy;
   an edge discovery module to, responsive to new data flow from a client on the local LAN in real-time, discover a remote network edge device associated with a destination of the new flow and a topology of the remote network edge device having two or more links connecting the remote network edge device to the data communication network, wherein a first link of the two or more links to the remote network edge device comprises an LTE connection and a second link comprises a broadband connection, wherein discovery includes collecting an IP address for IKE (Internet Key Exchange) negotiations and a domain ID to specify a type of underlay transport;
   a dynamic path manager to make an intelligent decision about which overlay path to select and when for the new flow over a control plane of the SD-WAN, based on the topology of the remote network edge and the local SD-WAN policy, and to build the selected overlay path.

2. The network edge device of claim 1, wherein the network edge device comprises a gateway device.

3. The network edge device of claim 1, wherein the dynamic path manager automatically updates the path selection based on a current health of the path, without additional provisioning.

4. The network edge device of claim 1, wherein the current health comprises one or more of latency, packet loss and jitter.

5. The network edge device of claim 1, wherein the centralized SD-WAN gateway administers a plurality of SD-WANs.

* * * * *